(12) United States Patent
Brütt et al.

(10) Patent No.: US 10,871,410 B2
(45) Date of Patent: Dec. 22, 2020

(54) FORCE OR TORQUE MEASURING DEVICE FOR A MOTORIZED VEHICLE WITH AN ATTACHMENT

(71) Applicant: WABCO GmbH, Hannover (DE)

(72) Inventors: Mirko Brütt, Ronnenberg (DE);
Johannes Bührke, Braunschweig (DE);
Ludger Frerichs, Sassenberg (DE);
Steffen Hanke, Hannover (DE);
Sebastian Kemper, Braunschweig (DE); Lars Thielke, Winsen/Aller (DE); Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 32 days.

(21) Appl. No.: 16/361,502

(22) Filed: Mar. 22, 2019

(65) Prior Publication Data

US 2019/0293506 A1   Sep. 26, 2019

(30) Foreign Application Priority Data

Mar. 22, 2018 (DE) .................. 10 2018 106 856

(51) Int. Cl.
 *G01L 5/13*   (2006.01)
 *G01L 1/22*   (2006.01)
 (Continued)

(52) U.S. Cl.
 CPC .............. *G01L 5/136* (2013.01); *A01B 63/00* (2013.01); *B60D 1/00* (2013.01); *B60T 1/00* (2013.01);
 (Continued)

(58) Field of Classification Search
 CPC ..... A01B 630/00; A01B 630/112; B60D 1/00; B60T 1/00; B60T 13/08; B60T 13/662;
 (Continued)

(56) References Cited

U.S. PATENT DOCUMENTS 4,573,362 A * 3/1986 Amlani ................ G01L 1/2218
 73/862.044
4,864,874 A * 9/1989 Hafner ...................... G01L 1/02
 73/862.382
 (Continued)

FOREIGN PATENT DOCUMENTS

DE     3907763 A1 *  9/1990  ............... B60T 7/20
DE     3935479 A1 *  5/1991  ............... G01L 1/20
 (Continued)

*Primary Examiner* — Jonathan M Dunlap
(74) *Attorney, Agent, or Firm* — Dickinson Wright PLLC (57) ABSTRACT

The present disclosure relates to a measuring device (42, 43) for measuring forces and/or torques between a motorized vehicle (1) and a trailer or attachment which is towed or pushed thereby, wherein the measuring device (42, 43) has at least three sensor elements (22, 34) which are arranged on a carrier (20, 31), transversely with respect to a virtual longitudinal axis of the motorized vehicle (1) and spaced apart from one another, wherein the measuring device (42, 43) is arranged in a coupling region between the motorized vehicle (1) and the pulled or pushed trailer or attachment, and wherein, in order to transmit their measured values, the sensor elements (22, 34) are connected to an evaluation device (40), which is configured to convert these measured values into signals for force displays and/or torque displays according to magnitude and direction.

13 Claims, 5 Drawing Sheets

(51) Int. Cl.
*G01L 5/161* (2020.01)
*B60T 1/00* (2006.01)
*B60D 1/00* (2006.01)
*A01B 63/00* (2006.01)
*A01B 63/112* (2006.01)
*B60T 8/00* (2006.01)
*B60T 8/171* (2006.01)
*B60T 13/66* (2006.01)
*B60T 8/17* (2006.01)
*G01L 1/16* (2006.01)
*B60T 13/08* (2006.01)
*B60T 7/20* (2006.01)

(52) U.S. Cl.
CPC ............ *G01L 1/2206* (2013.01); *G01L 5/161* (2013.01); *A01B 63/112* (2013.01); *B60T 7/20* (2013.01); *B60T 8/00* (2013.01); *B60T 8/17* (2013.01); *B60T 8/171* (2013.01); *B60T 8/1708* (2013.01); *B60T 13/08* (2013.01); *B60T 13/662* (2013.01); *G01L 1/162* (2013.01); *G01L 1/2231* (2013.01)

(58) Field of Classification Search
CPC ..... B60T 7/20; B60T 8/00; B60T 8/17; B60T 8/1708; B60T 8/171; G01L 5/161; G01L 5/136; G01L 1/162; G01L 1/2206; G01L 1/2231
See application file for complete search history.

(56) References Cited

U.S. PATENT DOCUMENTS

| | | | | |
|---|---|---|---|---|
| 5,149,121 | A | * | 9/1992 | Hafner .................. B60T 7/20 188/112 R |
| 5,213,396 | A | * | 5/1993 | Avery .................. B60T 7/20 188/112 R |
| 6,705,684 | B1 | * | 3/2004 | Garvey .................. B60T 7/20 303/123 |
| 2009/0032273 | A1 | * | 2/2009 | Hahn .................. A01B 69/004 172/2 |
| 2013/0253814 | A1 | * | 9/2013 | Wirthlin ............... G01L 11/025 701/124 |
| 2015/0290988 | A1 | * | 10/2015 | Masten ................ B60D 1/242 280/446.1 |
| 2018/0001720 | A1 | * | 1/2018 | McAllister ............. B60D 1/06 |

FOREIGN PATENT DOCUMENTS

| | | | | |
|---|---|---|---|---|
| EP | 0575634 | A1 * | 12/1993 | .......... G01L 3/1457 |
| EP | 0686839 | A2 * | 12/1995 | ............ B60D 1/248 |
| EP | 2251661 | A2 * | 11/2010 | .......... G01L 1/2231 |
| EP | 2280263 | A2 * | 2/2011 | ......... G01G 23/3735 |
| EP | 2348508 | A2 * | 7/2011 | ........... H04N 9/8205 |
| EP | 2 893 793 | B1 | 10/2016 | |
| GB | 2353340 | A * | 2/2001 | ............ B60T 13/66 |
| WO | WO-9102226 | A1 * | 2/1991 | ............ G01L 5/136 |

* cited by examiner

FORCE OR TORQUE MEASURING DEVICE FOR A MOTORIZED VEHICLE WITH AN ATTACHMENT

TECHNICAL FIELD

The present disclosure relates to a measuring device for measuring forces and/or torques between a motorized vehicle and a trailer or attachment towed or pushed thereby.

BACKGROUND

EP 2 893 793 B1 discloses a traction force measuring system integrated into a suspension frame of a tractor. The suspension frame is configured to be fastened to a rear frame of an agricultural tractor and has left-hand and right-hand traction connection support, wherein the left-hand and right-hand traction connection supports each couple a corresponding left-hand and a right-hand traction connection to a corresponding left-hand and right-hand side of the suspension frame. Only horizontal traction forces exerted by the left-hand and right-hand traction connections to the left-hand and right-hand traction connection supports are mechanically added. A traction force instrument transformer, arranged to protect it between the traction connections in a housing, generates therefrom a unidimensional traction force signal. The suspension frame is of a complicated design, and the traction force instrument transformer can only be used with this suspension frame. The traction force measuring system is not suitable for generating, and—if appropriate—displaying, forces and/or torques between a motorized vehicle and a trailer or attachment, towed or pushed thereby, according to magnitude and direction.

SUMMARY

Against this background, the present disclosure is based on the object of measuring coupling forces and coupling torques at the coupling point between a motorized vehicle, in particular a tractor, and a trailer or attachment, in three dimensions during driving, without special devices having to be provided for this on the trailer or attachment. In the following, a trailer is considered a specific type of attachment so that a trailer is a species within the genus of attachments.

Accordingly, the present disclosure relates to a measuring device for measuring forces and/or torques between a motorized vehicle and a trailer or attachment towed or pushed thereby.

According to the present disclosure there is provision that the measuring device has at least three sensor elements which are arranged on a carrier, transversely with respect to a virtual longitudinal axis of the motorized vehicle and spaced apart from one another, wherein the measuring device is arranged in a coupling region between the motorized vehicle and the pulled or pushed trailer or attachment, and wherein, in order to transmit their measured values, the sensor elements are connected to an evaluation device configured to convert these measured values into signals for force displays and/or torque displays according to magnitude and direction.

This measuring device is located basically in the region of the motorized vehicle, with the result that there is no need to make changes to a trailer or attachment or the coupling devices thereof. Owing to the measured values, in the form of forces and/or torques, which can be obtained in terms of absolute value and direction in all three spatial coordinates, there is provision in one development of the present disclosure that the abovementioned evaluation device is placed in a data connection with the vehicle status management system configured to detect unstable driving situations from the measured values of the sensor elements and initiate counter-steering measures. The vehicle status management system is for this purpose preferably embodied as a microcomputer which, in order to carry out counter-steering measures, is equipped with suitable software and is connected to suitable actuators and/or electromagnetic control valves in order to actuate the latter.

Furthermore, the vehicle status management system is configured in one development of the present disclosure in such a way that it is able to generate, from the measured values of the sensor element, control signals for actuators for bringing about adjustment matching of the braking effect of the motorized vehicle and of the trailer or of the attachment to one another.

According to one advantageous development of a measuring device which has the features of the present disclosure there is provision that the measuring device is mounted as a module package between a screw-on receptacle on the motorized vehicle for a standard suspension frame and this standard suspension frame, and in that a standard attachment device, such as a standard open-end coupling or a standard ball head coupling, is fastened directly to the standard suspension frame.

This standard hitch device is preferably fastened to the standard suspension frame in a detachable and vertically adjustable fashion.

Furthermore, there is preferably provision that the measuring device can be mounted as a module package on a standard suspension frame on the motorized vehicle, and is screwed to a standard attachment device, such as a standard open-end coupling or a standard ball head coupling, by means of a coupling carrier arranged on the standard suspension frame.

It is particularly advantageous if the coupling carrier is fastened to the standard suspension frame in a detachable and vertically adjustable fashion.

According to a first advantageous embodiment of the measuring device, there can be provision that four sensor elements in the form of load cells, strain gauges or SAW (surface acoustic wave) elements as force sensors are arranged on the carrier in the form of a measuring plate, spaced apart in the square or in the rectangle, and that the four sensor elements are, on the one hand, fastened by means of the carrier in the form of a measuring plate to a screw-on receptacle in the form of a fastening plate to the motorized vehicle and, on the other hand, are operatively connected to the standard suspension frame, in order to generate signals which are intended for the evaluation device, by the loading of the standard suspension frame by the load of the towed or pushed trailer or of the attachment.

As a result of the operative connection between the standard suspension frame and the measuring plate, the four sensor elements are deformed by the load of the towed or pushed trailer or attachment, as a function of magnitude and direction of the stresses of the standard suspension frame. From the signals of the sensor elements, the forces Fx, Fy, Fz in the X, Y and Z directions of a rectangular coordinate system can be calculated by means of known algorithms, as can the torques Mx, My and Mz which occur. These forces and torques are dependent on the height of the standard hitch device above the level of the ground and on an angle α which a tow bar of a trailer or of an attachment assumes in a horizontal transverse plane with respect to the motorized vehicle, and likewise on an angle β which the tow bar of the trailer or of the attachment assumes vertically in the upward or downward directions with respect to the horizontal transverse plane of the motorized vehicle.

According to a second advantageous embodiment of the measuring device according to the invention, there is provision that four sensor elements in the form of load cells, strain gauges or SAW elements as force sensors are arranged on four spokes which are offset by approximately 90° with respect to one another and extend radially from a central cylindrical hub, that the spokes are coupled to a carrier in the form of a measuring plate in a frictionally locking, positively locking or materially joined fashion, wherein this carrier in the form of a measuring plate is clamped in, together with an adapter plate to which the central cylindrical hub is coupled in a positively locking fashion or materially joined fashion, between a screw-on plate of a standard hitch and a standard coupling carrier.

In this context, a pre-stress can be applied to the spokes via the axially projecting region of the cylindrical hub by means of expansion screws which are arranged between the screw-on plate of a standard hitch and the standard coupling carrier. For this purpose, there is provision that a recess which faces the standard coupling carrier and releases the spokes and permits the deformation thereof when the pre-stress is applied by means of the expansion screws is formed in the carrier in the form of a measuring plate.

In this case also, the measuring device can be embodied as a module package which is composed of the screw-on plate of the standard hitch device, the adapter plate, the carrier in the form of a measuring plate and the standard coupling carrier, which are braced with respect to one another by means of expansion screws. This module package is embodied in such a way that it can preferably be attached in a vertically adjustable fashion to a standard suspension frame which is fastened to the motorized vehicle.

It is apparent that different standard hitch devices which can be adjusted in height by the described vertical guide system on the suspension frame can be attached to a standard suspension frame.

The transmission of the signals of the sensor elements to the motorized vehicle can be carried out via a cable connection or in a wireless fashion, for example by means of W-LAN.

On the basis of the design of the measuring device according to the invention, said device can be used both on agricultural vehicles, in particular agricultural tractors, and on road vehicles. Various standard hitch devices can be exchanged in a modular fashion without any changes having to be made to the measuring device. The masses of the motorized vehicle and of the trailer or attachment can also be determined by the measuring device according to the invention, as a result of which the braking effects of motorized vehicles and trailers or attachments can be matched in an improved way.

The present disclosure will be explained in more detail below with reference to a plurality of exemplary embodiments which are illustrated in the appended drawings. The drawings are provided herewith for purely illustrative purposes and are not intended to limit the scope of the present invention.

BRIEF DESCRIPTION OF THE DRAWINGS

In the drawings,

FIG. 1 shows a simplified, exploded illustration of the components of a measuring device for measuring forces and/or torques between a motorized vehicle and a trailer or attachment pulled or pushed thereby;

FIG. 2 shows a simplified exploded isometric illustration of the components of a measuring device according to the present disclosure according to a second embodiment; of which

DETAILED DESCRIPTION OF THE DRAWINGS

Figure 1A:
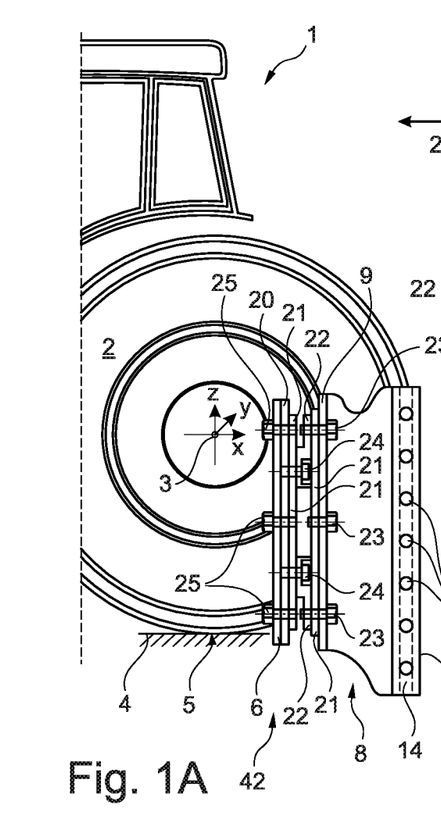
FIG. 1A shows a partial view of a motorized vehicle in the form of a tractor with a schematic side view of the measuring device according to FIG. 1.

Accordingly, FIG. 1 shows a simplified exploded illustration of the components for a measuring device 42 for measuring forces and/or torques between a motorized vehicle and a trailer or attachment (not illustrated) towed or pushed thereby. In detail, FIG. 1A shows a partial view of a motorized traction vehicle in the form of a tractor 1, on the rear of which a box-shaped standard suspension frame 8 is screwed on, as will be explained later.

Figure 1B:
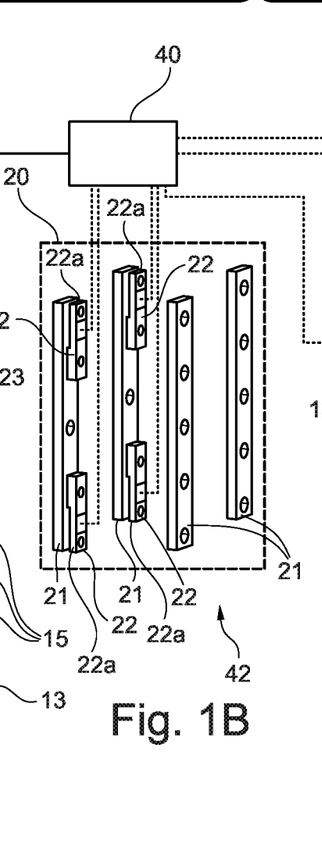
FIG. 1B shows an exploded isometric illustration of the measuring device according to FIG. 1A.

FIG. 1B shows a schematic view of a first measuring device 42 whose carrier 20 for sensor elements 22 is embodied in the form of a measuring plate and is screwed, by means of fastening screws 25, to a screw-on receptacle 6 in the form of a fastening plate on the tractor 1. A total of four sensor elements 22 are screwed tight to the carrier 20 embodied as a measuring plate, by means of countersunk fastening screws 24 via intermediately positioned fastening rails 21.

The sensor elements 22 have free-standing tongues 22a which are screwed tight to the standard suspension frame 8 via a further pair of fastening rails 21, by means of fastening screws 23. The sensor elements 22, which are connected to the evaluation device 40 in a wireless fashion or via line connections illustrated with a dotted line, are attached to the free-standing tongues 22a. The evaluation device 40 is embodied at least as an electronic circuit but preferably as a microcomputer. It can be arranged on the carrier 20 embodied as a measuring plate or on the tractor 1.

The zero point of a right-angled, three-axis coordinate system with the coordinate axes X, Y, Z is shown on a wheel rotational axis 3 of the rear wheel 2 of the tractor 1, wherein the Z axis runs through a wheel contact point 5 of the rear wheel 2 at the level of the ground 4.

The standard suspension frame 8 illustrated in a schematic side view in FIG. 1A is fastened to the tractor 1 by means of a tractor fastening plate 9 on the screw-on receptacle 6, between which the aforementioned measuring device 42 is fastened. The sensor elements 22 serve for measuring force and can be embodied as load cells, strain gauges or SAW elements (surface acoustic wave elements).

Figures 1C, 1D:
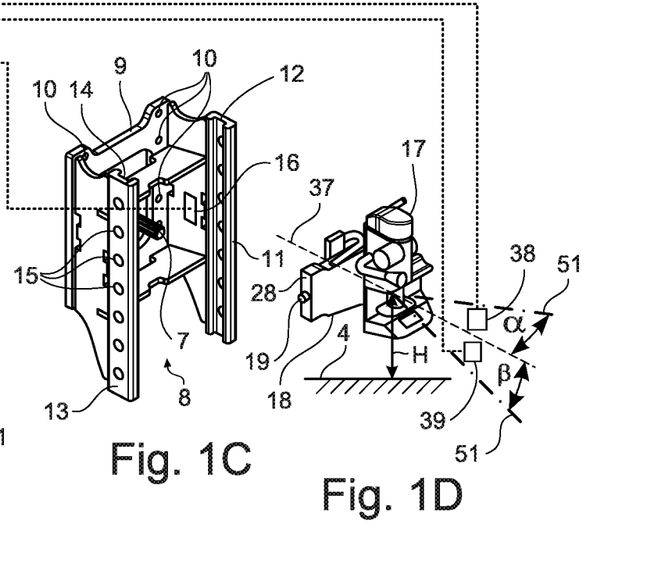
FIG. 1C shows an isometric illustration of a box-shaped standard suspension frame of a tractor.
FIG. 1D shows a schematic isometric illustration of a standard hitch device in the form of an open-end coupling.

The box-shaped standard suspension frame 8 illustrated in FIG. 1C has the tractor fastening plate 9 already mentioned above and the same drilled hole pattern 10 as the fastening plate 6 complementary thereto on the tractor 1. A first latching rail 11 with a first latching groove 12 and a second latching rail 13 with a second latching groove 14 are attached, parallel to one another, on side walls of the standard suspension frame 8, the latching grooves 12, 14 of which latching rails 11, 13 are opened in such a way that they point to one another. Along the two latching grooves 12, 14 drilled holes 15 are formed for locking means 19 in the form of locking pins, into which drilled holes 15, for example, the locking pins 19 engage on a latching plate 18 of a standard open-end coupling 17 and secure the latter to a height H from the level of the ground 4. A sensor 16 for detecting the height H of the standard coupling 17 is arranged on a side wall of the standard suspension frame 8.

Furthermore, according to FIG. 1D a sensor element 38 is present which measures the angle α between a tow bar 51 of a trailer or attachment and a straight line running through a central longitudinal axis of the tractor 1 at the height H in the X direction, in a horizontal transverse plane 37 at the height H of the standard coupling 17. Furthermore, there is a further sensor element 39 for measuring the angle β in the upward or downward directions between the tow bar 51 of a trailer or attachment and a horizontal transverse plane at the height H in the X direction.

The specified sensor elements 16, 38, 39 are also connected to the evaluation device 40 in a wireless fashion or via the leads which are illustrated by dotted lines but are not denoted further. Therefore, the evaluation device 40 can calculate, by means of known algorithms, both the forces Fx, Fy, Fz which act on the measuring device 20 and the corresponding torques Mx, My, Mz from the signals of the sensor elements 16, 22, 38, 39 in terms of magnitude and direction and pass them on to a driving state management system. This driving state management system can detect unstable driving situations by deriving them from the signals of the sensor elements 16, 22, 38, 39 and initiate counter-steering measures. Likewise, it is possible to adjust the braking effect of the tractor 1 and of the trailer or of the attachment on the basis of the signals of the sensor elements 16, 22, 38, 39. The driving state management system is embodied, for example, as a computer program and is stored in a separate microcomputer or in an evaluation device 40 as software.

Figure 2A:
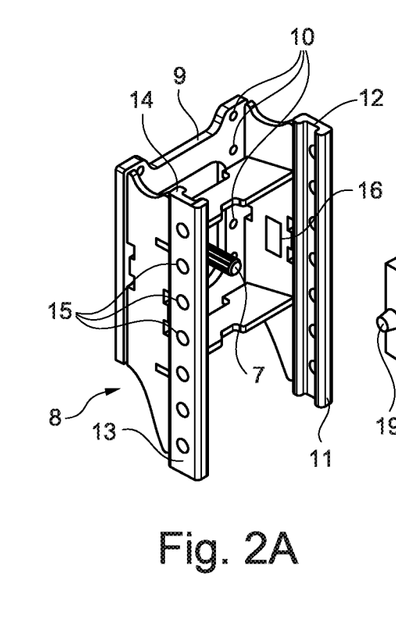
FIG. 2A shows an isometric illustration of a box-shaped standard suspension frame for a tractor.
Figures 2B, 2C, 2D:
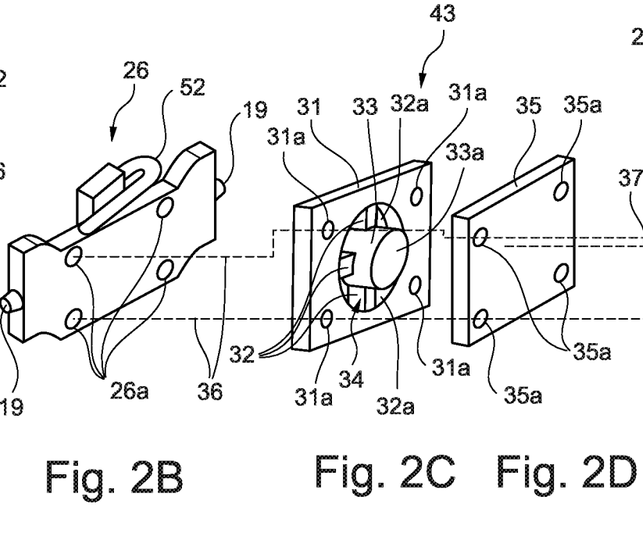
FIG. 2B shows an isometric illustration of a standard coupling carrier with locking means.
FIG. 2C shows an isometric illustration of a measuring device on a trailer in the form of a measuring plate with a spoke wheel geometry according to FIG. 2.
FIG. 2D shows an isometric illustration of an adapter plate.
Figures 2E, 2F:
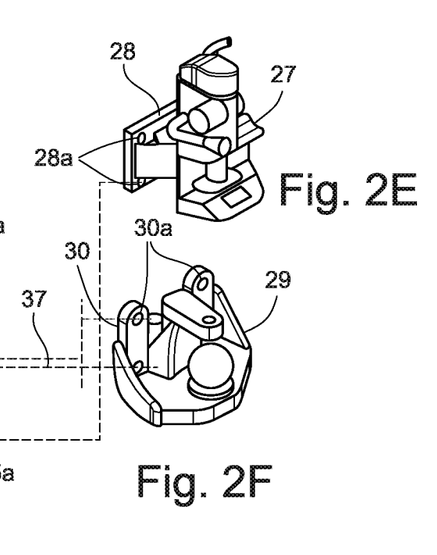
FIG. 2E shows an isometric illustration of a standard open-end coupling with standard screw-on plate.
FIG. 2F shows an alternative isometric illustration of a standard ball-head coupling with a screw-on plate.

The measuring device 42 can both be mounted as a module package between the tractor 1 and the standard suspension frame 8 and inserted, with the carrier 20 embodied as a measuring plate, into the latching grooves 12, 14 of the standard suspension frame 8 and secured therein at the aforementioned height H, wherein a standard hitch device 27 in the form of an open-end coupling according to FIG. 2E is then screwed with its screw-on plate 28 to the carrier 20. For this purpose, the screw-on plate 28 of the standard hitch device 27 has a congruent standard hole pattern 28a like the carrier 20.

A power take-off shaft 7, which can be seen in FIG. 1C, can be used to drive secondary assemblies only if it is not locked by the measuring device 42. If appropriate, the carrier 20 in the form of a measuring plate has a through-opening for the power take-off shaft 7.

A second embodiment of the measuring device 43 according to the present disclosure is illustrated in FIG. 2, FIG. 2A of which shows the box-shaped standard suspension frame 8, which is also illustrated in FIG. 1C. This measuring device 43 has a carrier 31 in the form of a measuring plate with the standard hole pattern 31a, which is congruent with a standard hole pattern 26a of threaded drilled holes in a standard coupling carrier 26. The standard coupling carrier 26 can, as already described, be inserted into the latching grooves 12, 14 of the standard suspension frame 8 and secured in the drilled holes 15 of the standard suspension frame 8 by means of locking means 19 in the form of the locking pins on the standard coupling carrier 26.

As is apparent from FIG. 2C, the carrier 31 in the form of a measuring plate preferably has radial spokes 32, formed integrally on the latter and arranged in a plane at an angle of 90° with respect to one another. Free spaces 32a are therefore formed between the radial spokes 32 and the carrier 31, in order to permit the radial spokes 32 to deform in the direction of the horizontal transverse plane 37.

The spokes 32 are connected radially on the inside to a central cylindrical hub 33 whose axially protruding region 33a is connected in a materially joined fashion to an adapter plate 35, preferably by means of a welded seam 33b. The carrier 31 in the form of a measuring plate has, as mentioned above, a standard hole pattern 31a congruent with the standard hole pattern 26a on the standard coupling carrier 26. The adapter plate 35 also has such a standard hole pattern 35a.

Sensor elements 34 in the form of load cells, strain gauges or SAW elements are attached as force sensors to the radial spokes 32, which force sensors are connected to the evaluation device 40 in a wireless fashion or by means of cables, in the way illustrated in FIG. 1. The radio transmission of the acquired measured values of the sensor elements 34 can also be carried out by means of a relevant transmitter connected to an antenna 52 arranged on the upper side of the standard coupling carrier 26.

The carrier 31 in the form of a measuring plate is clamped in, with the adapter plate 35 to which the axially projecting region 33a of the central cylindrical hub 33 is coupled in a positively locking or materially joined fashion between a screw-on plate 28 on a standard open-end coupling 27 or a screw-on plate 30 on a standard ball head coupling 29 and a standard coupling carrier 26 with pre-stress of the spokes 32.

The pre-stress of the spokes 32 is applied by means of expansion screws 36 which are arranged between the screw-on plate 28, 30 of a standard hitch 27, 29 and the standard coupling carrier 26. The screw-on plates 28, 30 of the standard hitch 27 and the standard ball head coupling 29 each have for this purpose a congruent standard hole pattern 28a, 30a for leading through expansion screws 36.

Figure 2G:
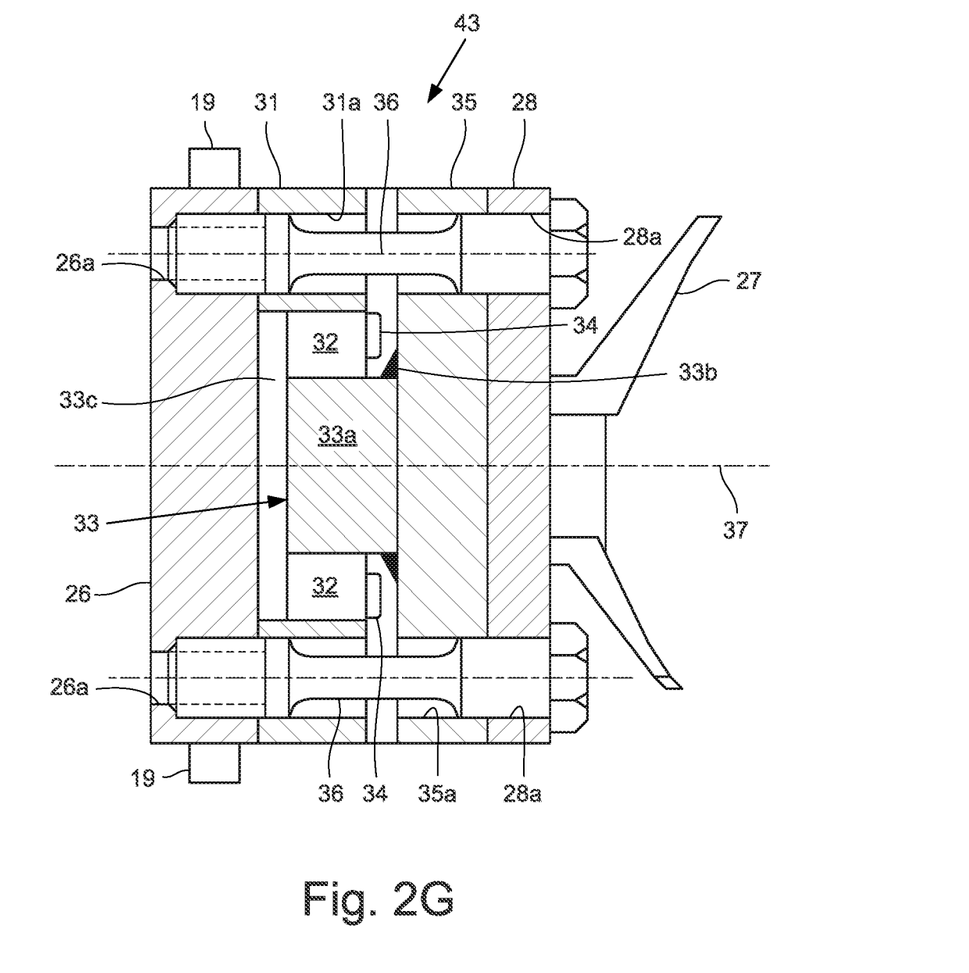
FIG. 2G shows a sectional view of the measuring device according to FIG. 2A with the elements according to FIGS. 2B to 2E.

As is shown in FIG. 2G, recesses or free spaces 33c which release the spokes 32 and permit the deformation thereof when the pre-stress is applied by means of the expansion screws 36, are formed in the carrier 33 in the form of a measuring plate. As a result, a deformation of the spokes 32 in the direction of the standard clutch carrier 26 can be brought about by means of a thrust force which acts on the standard hitch 27, with the result that this thrust force and the pre-stress applied by the expansion screws 36 can be measured by means of the sensor elements 34.

Figure 7:
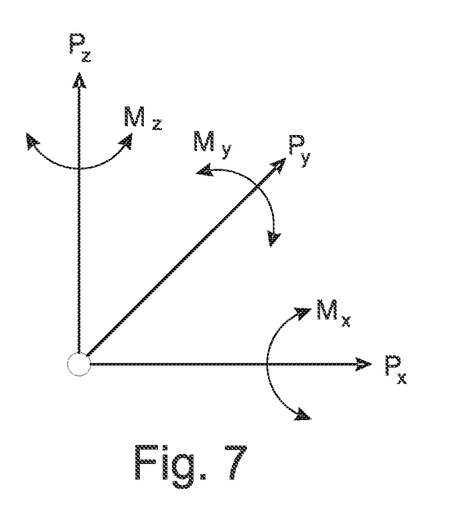
FIG. 7 shows a right-angled, three-dimensional coordinate cross with indicated forces Fx, Fy, Fz and torques Mx, My, Mz.

Conversely, a movement of the adapter plate 35 and therefore of the central cylindrical hub 33a is caused by a traction force applied to the standard hitch 27. This brings about corresponding release of the stress of the radial spokes 32, which can also be detected by means of the sensor elements 34 and owing to the arrangement of the four radial spokes 32 offset by 90° gives rise to signals, which, when viewed together, result in values for the applied forces Fx, Fy, Fz in the X, Y and Z directions and the corresponding torques Mx, My, Mz as illustrated in FIG. 7, by means of a corresponding algorithm of the evaluation device 40.

Figures 3, 4, 5:
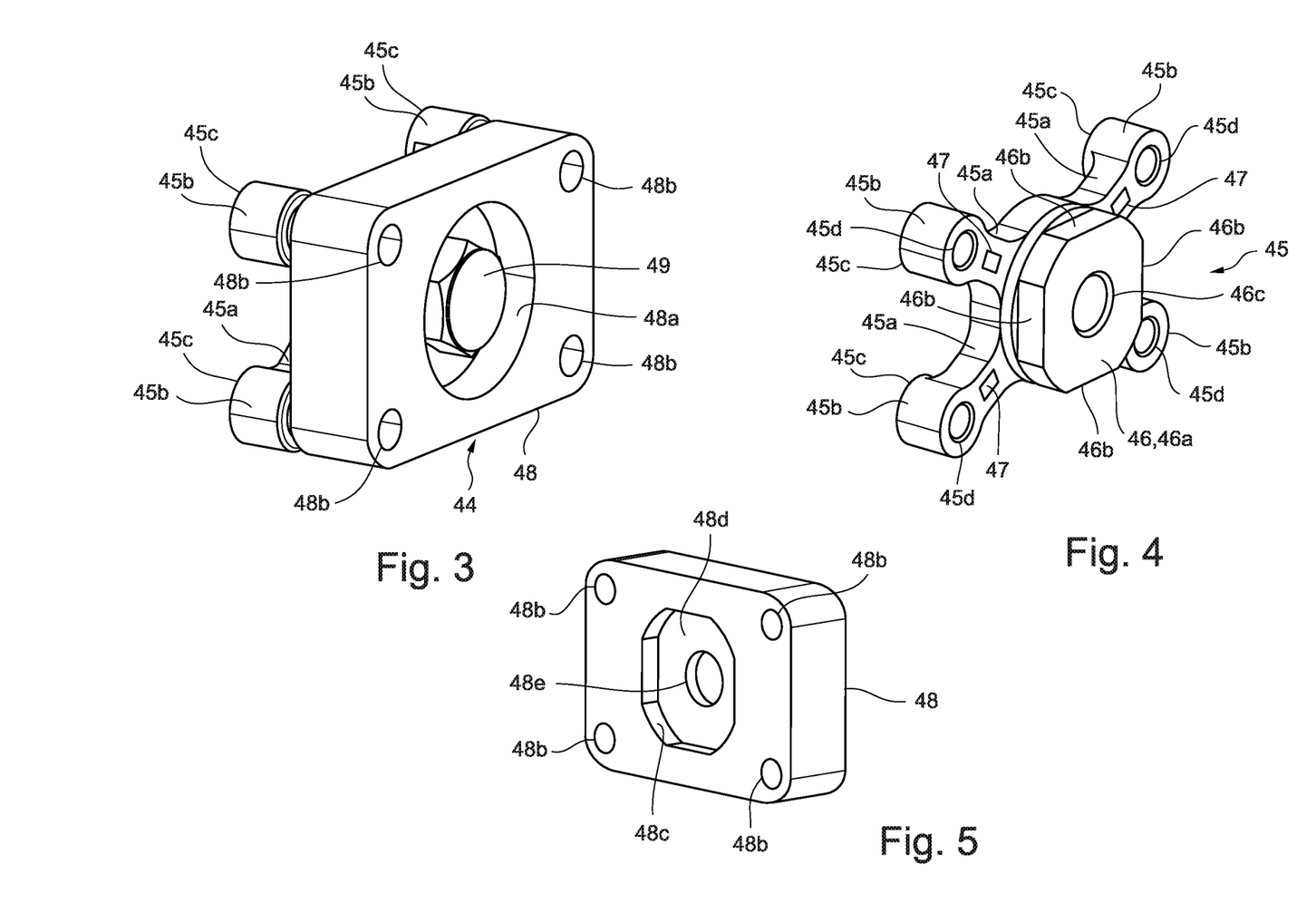
FIG. 3 shows an isometric illustration of a measuring device according to the present disclosure with a measuring cross according to FIG. 4.
FIG. 4 shows an isometric illustration of a measuring cross, to be braced with a baseplate, according to FIG. 3.
FIG. 5 shows an isometric rear view of the baseplate according to FIG. 4.
Figure 6:
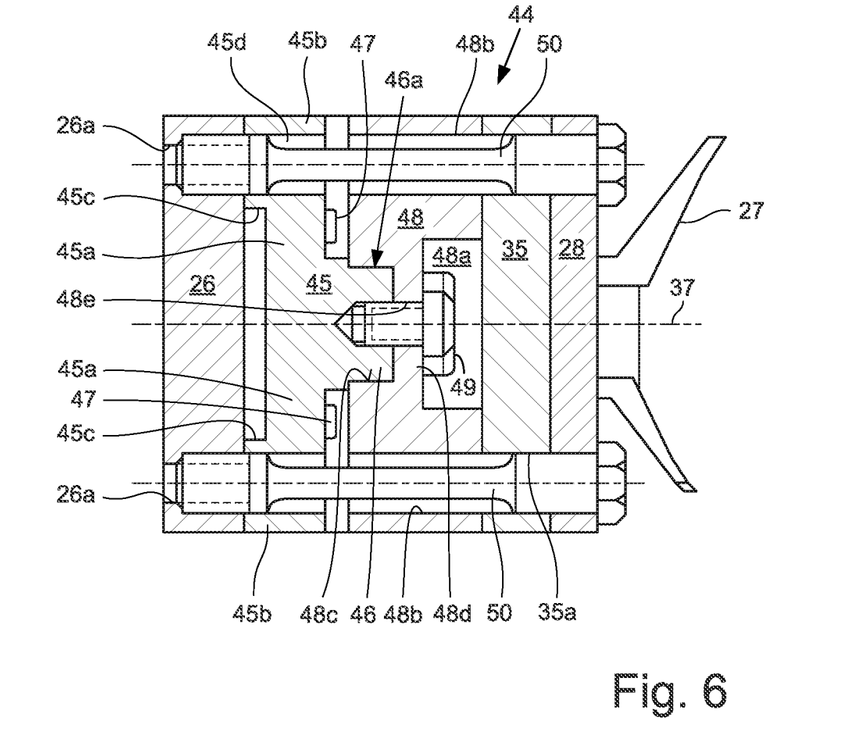
FIG. 6 shows a sectional view of the assembled measuring device according to FIGS. 3 to 5.

The third embodiment of a variant of the measuring device 44 illustrated in FIGS. 3 to 6 has a carrier 45 in the form of a measuring cross with in each case two measuring arms spaced apart by 60° or 120° whose free ends have eyelets 45b with drilled through-holes 45d and which are provided at the free ends with axial projections 45c whose function is explained in conjunction with FIG. 6. The carrier 45 in the form of a measuring cross is provided with a central hub 46 which is embodied in an essentially cylindrical fashion but is provided with flattened portions 46b at a region 46a which projects axially on one side. This axially projecting region 46a with its flattened portions 46b can be inserted in a non-circular depression 48c, complementary to the hub 46, in a baseplate 48, as a result of which the carrier 45 in the form of a measuring cross is secured against rotation with respect to the baseplate 48. The non-circular depression 48c of the baseplate 48 ends axially at a wall element 48d with a central drilled through-hole 48e for a fastening screw 49 which is illustrated in FIG. 3 and screwed into a threaded drilled hole 46c in the central hub 46 of the carrier 45 in the form of a measuring cross.

On its rear side remote from the measuring cross, the baseplate 48 has a cylindrical depression 48a into which the head of the fastening screw 49 can be lowered. Furthermore, FIGS. 3 and 5 show clearly that the baseplate 48 has four drilled through-holes 48b for leading through the already mentioned expansion screws 50 which are also led through the drilled through-holes 45d of the carrier 45 and are ultimately screwed in the threaded drilled holes 26a of the standard coupling carrier 26 which can be seen clearly in FIG. 6.

In each case sensor elements 47 in the form of load cells, strain gauges or SAW elements are arranged on the measuring arms 45a as force sensors between the eyelets 45b at the free ends of the four measuring arms 45a and of the central hub 46 of the carrier 45, and are connected, in a way corresponding to FIG. 1, to the evaluation device 40 in a wireless fashion or by means of cables, as are also the other sensor elements.

The measuring device 44 according to FIGS. 3 to 6 can also be attached, as a module package composed of the screw-on plate 28, 30 of the standard hitch device 27, 29, the adapter plate 35, the baseplate 48, the carrier 45 in the form of a measuring cross and the standard coupling carrier 26 which are braced with respect to one another by means of the expansion screws 50, in a vertically adjustable fashion to a standard suspension frame 8 fastened to the motorized vehicle 1.

LIST OF REFERENCE SYMBOLS (PART OF THE DESCRIPTION)

Motorized vehicle (tractor)
Rear wheel
Wheel rotation axis
Level of the ground
Wheel contact point
Screw-on receptacle (fastening plate on the tractor)
Power take-off shaft
Standard suspension frame, box-shaped
Tractor fastening plate on suspension frame
Drilled hole pattern on standard suspension frame
First latching rail on standard suspension frame
First latching groove
Second latching rail on standard suspension frame
Second latching groove
Drilled holes for locking means in latching rail
Sensor element for detecting the coupling height H
Standard open-end coupling
Latching plate on open-end coupling
Locking means (latching pin)
Carrier in the form of a measuring plate
Fastening rails
Sensor elements
22a Free-standing tongues of sensor elements 22
23 Fastening screws
24 Countersunk fastening screws
25 Fastening screws
26 Standard coupling carrier with locking means
26a Standard hole pattern of threaded drilled holes on coupling carrier 26
27 Standard open-end coupling
28 Standard screw-on plate on open-end coupling 27
28a Standard hole pattern of drilled through-holes in screw-on plate 28
29 Standard ball head coupling
30 Standard screw-on plate on ball head coupling 29
30a Standard hole pattern of drilled through-holes in screw-on plate 30
31 Carrier in the form of a measuring plate
31a Standard hole pattern of drilled through-holes in carrier 31
32 Radial spokes on carrier 31
32a Free space between spokes 32
33 Central cylindrical hub on carrier 31
33a Axially projecting region of hub 33
33b Welded seam
33c Recess in carrier 31
34 Sensor elements on spokes
35 Adapter plate
35a Standard hole pattern of drilled through-holes in adapter plate 35
36 Expansion screws
37 Horizontal transverse plate through a longitudinal axis of the tractor at height H of the standard coupling 17, in the direction of the X axis
38 Sensor element for measuring angle α
39 Sensor element for measuring angle β
40 Evaluation device
42 First embodiment of a measuring device
43 Second embodiment of a measuring device
44 Third embodiment of a measuring device 45 Carrier in the form of a measuring cross
45a Measuring arms on carrier 45
45b Eyelets on measuring arms 45a
45c Projections on eyelets 45b
45d Drilled through-holes in eyelets 45b
46 Central hub of carrier 45
46a Region of the hub 46 projecting axially on one side
46b Flattened portions on hub 46
46c Threaded drilled hole in hub 46
47 Sensor elements on measuring arms 45a
48 Baseplate
48a Cylindrical depression in baseplate 48
48b Drilled through-holes in baseplate 48
48c Non-circular depression in baseplate 48
48d Wall element of baseplate 48
48e Central drilled hole in baseplate 48
49 Fastening screw
50 Expansion screws
51 Tow bar of the trailer or of attachment
52 Antenna
H Distance of standard hitch on tractor from level of ground
X, Y, Z Coordinate axes
α Angle between a tow bar of a trailer or attachment and a straight line running through a central longitudinal axis of a trailer at height H in X direction
β Angle in upward or downward direction between a drawbar of a trailer or attachment and a horizontal transverse plane at height H in X direction

What is claimed is:

1. A measuring device (42, 43, 44) for measuring forces or torques between a motorized vehicle (1) and an attachment towed or pushed thereby, the measuring device (42, 43, 44) comprising:
a carrier (20, 31, 45);
an evaluation device (40); and
at least three sensor elements (22, 34, 47) arranged on the carrier (20, 31, 45), transversely with respect to a virtual longitudinal axis of the motorized vehicle (1) and spaced apart from one another,
wherein the measuring device (42, 43, 44) is arranged in a coupling region between the motorized vehicle (1) and the attachment,
and wherein the sensor elements (22, 34, 47) are connected to the evaluation device (40) and configured to transmit measured values,
the evaluation device (40) being configured to convert the measured values into signals for displaying at least one quantity representing a force or a torque according to magnitude and direction,
wherein the measuring device (42, 43, 44) in configured to be mounted on the motorized vehicle (1) as a module package on a standard suspension frame (8) and is screwed to a standard attachment device (17, 27, 29) via a coupling carrier (26) arranged on the standard suspension frame (8).

2. The measuring device (42, 43, 44) as claimed in claim 1, wherein the evaluation device (40) has a data connection to a driving state management system, which is configured to detect unstable driving situations from the measured values of the sensor elements (22, 34, 47) and to initiate counter-steering measures.

3. The measuring device (42, 43, 44) as claimed in claim 2, wherein the driving state management system is configured to generate, from the measured values from the sensor elements (22, 34, 47), control signals for actuators for bringing about an adjustment matching of the braking effect of the motorized vehicle (1) and of the trailer or of the attachment to one another.

4. The measuring device (42, 43, 44) as claimed in claim 1, wherein the measuring device (42, 43, 44) is mounted on the motorized vehicle (1) as a module package between a standard suspension frame (8) and a screw-on receptacle (6) for the standard suspension frame (8), and a standard attachment device (17, 27, 29) is fastened directly to the standard suspension frame (8).

5. The measuring device (42, 43, 44) as claimed in claim 4, wherein the standard attachment device (17, 27, 29) is a standard open-end coupling (17, 27) or a standard ball head coupling (29).

6. The measuring device (42, 43, 44) as claimed in claim 4, wherein the standard attachment device (17, 27, 29) is fastened to the standard suspension frame (8) in a detachable and vertically adjustable fashion.

7. The measuring device (42, 43, 44) as claimed in claim 1, wherein the standard attachment device (17, 27, 29) is a standard open-end coupling (17, 27) or a standard ball head coupling (29).

8. The measuring device (42, 43, 44) as claimed in claim 1, wherein the coupling carrier (26, 61) is fastened to the standard suspension frame (8) in a detachable and vertically adjustable fashion.

9. A measuring device (42, 43, 44) for measuring forces or torques between a motorized vehicle (1) and an attachment towed or pushed thereby, the measuring device (42, 43, 44) comprising:
a carrier (20, 31, 45);
an evaluation device (40); and
at least three sensor elements (22, 34, 47) arranged on the carrier (20, 31, 45), transversely with respect to a virtual longitudinal axis of the motorized vehicle (1) and spaced apart from one another,
wherein the measuring device (42, 43, 44) is arranged in a coupling region between the motorized vehicle (1) and the attachment,
and wherein the sensor elements (22, 34, 47) are connected to the evaluation device (40) and configured to transmit measured values, the evaluation device (40) being configured to convert the measured values into signals for displaying at least one quantity representing a force or a torque according to magnitude and direction,
wherein the carrier (20) is a measuring plate,
wherein the at least three sensor elements are four sensor elements (22) in the form of load cells, strain gauges or SAW elements as force sensors and are arranged on the carrier (20) spaced apart in a square or in a rectangle,
wherein the four sensor elements (22) are fastened to a screw-on receptacle (6) of the motorized vehicle (1) via the carrier (20) and are operatively connected to a standard suspension frame (8) to generate signals for the evaluation device (40), the signals being representative of stress on the standard suspension frame (8) or of a load on the trailer or of the attachment.

10. A measuring device (42, 43, 44) for measuring forces or torques between a motorized vehicle (1) and an attachment towed or pushed thereby, the measuring device (42, 43, 44) comprising:
a carrier (20, 31, 45);
an evaluation device (40); and
at least three sensor elements (22, 34, 47) arranged on the carrier (20, 31, 45), transversely with respect to a virtual longitudinal axis of the motorized vehicle (1) and spaced apart from one another, wherein the measuring device (42, 43, 44) is arranged in a coupling region between the motorized vehicle (1) and the attachment, and wherein the sensor elements (22, 34, 47) are connected to the evaluation device (40) and configured to transmit measured values, the evaluation device (40) being configured to convert the measured values into signals for displaying at least one quantity representing a force or a torque according to magnitude and direction, wherein the at least three sensor elements are four sensor elements (34) in the form of load cells, strain gauges or SAW elements as force sensors are arranged on four spokes (32) which are offset by approximately 90° with respect to one another and extend radially from a central cylindrical hub (33), in that the spokes (32) are coupled to a carrier (31) in the form of a measuring plate in a frictionally locking, positively locking or materially joined fashion, wherein the carrier (31) is clamped in, together with an adapter plate (35) to which the central cylindrical hub (33) is coupled in a positively locking fashion or materially joined fashion, between a screw-on plate (28, 30) of a standard hitch (27, 29) and a standard coupling carrier (26).

11. The measuring device (43) as claimed in claim 10, wherein a pre-stress is applied to the spokes (32) via an axially projecting region (33a) of the cylindrical hub (33) by expansion screws (36) arranged between the screw-on plate (28, 30) of a standard hitch (27, 29) and the standard coupling carrier (26).

12. The measuring device (43) as claimed in claim 10, wherein carrier (31) is a measuring plate, wherein a recess (33b) facing the standard coupling carrier (26) is disposed in the carrier (31) and releases the spokes (32) and permits the deformation thereof when the pre-stress is applied by the expansion screws (36).

13. The measuring device (43) as claimed in claim 10, wherein the measuring device (43) is a module package composed of the screw-on plate (28, 30) of the standard hitch device (27, 29), the adapter plate (35), the carrier (31) and the standard coupling carrier (26), which are braced with respect to one another by the expansion screws (36), in such a way that module package is configured to be attached in a vertically adjustable fashion to a standard suspension frame (8) which is fastened to the motorized vehicle (1).

* * * * *